US008833865B2

(12) United States Patent
Niedermayer (10) Patent No.: US 8,833,865 B2
(45) Date of Patent: Sep. 16, 2014

(54) VEHICLE WHEEL COMPONENTS, INCLUDING VEHICLE WHEELS, COMPRISING A SURFACE COATING AND METHOD FOR PRODUCING SUCH VEHICLE WHEEL COMPONENTS

(75) Inventor: Klaus Niedermayer, Neuendorf (CH)

(73) Assignee: Ronal AG, Härkingen (CH)

(*) Notice: Subject to any disclaimer, the term of this patent is extended or adjusted under 35 U.S.C. 154(b) by 123 days.

(21) Appl. No.: 13/258,608

(22) PCT Filed: Nov. 18, 2010

(86) PCT No.: PCT/EP2010/007013
§ 371 (c)(1),
(2), (4) Date: Sep. 22, 2011

(87) PCT Pub. No.: WO2011/060934
PCT Pub. Date: May 26, 2011

(65) Prior Publication Data
US 2012/0019047 A1  Jan. 26, 2012

(30) Foreign Application Priority Data
Nov. 21, 2009  (DE) .......................... 10 2009 054 243

(51) Int. Cl.
*B60B 19/00* (2006.01)
*B60B 3/02* (2006.01)
(52) U.S. Cl.
CPC ....................................... *B60B 3/02* (2013.01)
USPC .......................................................... 301/51
(58) Field of Classification Search
USPC .............. 301/55, 58, 61, 67, 70, 104, 51, 101
See application file for complete search history.

(56) References Cited

U.S. PATENT DOCUMENTS 3,883,181 A * 5/1975 Dissinger .................... 301/37.42
4,059,069 A * 11/1977 Ford .............................. 118/642
(Continued)

FOREIGN PATENT DOCUMENTS

DE    193 4918 U    3/1966
DE        61229 A1  5/1968
(Continued)

OTHER PUBLICATIONS

Internet: www.stockamr.de—Ritztechnik/Sgraffito.

*Primary Examiner* — S. Joseph Morano
*Assistant Examiner* — Jean Charleston
(74) *Attorney, Agent, or Firm* — McGlew and Tuttle, P.C.

(57) ABSTRACT

Multicolor motor vehicle wheels and vehicle wheel components are increasingly desirable. The coloring has been carried out so far essentially by expensive manual labor. The present invention provides for an industrially applicable method for preparing color-coated vehicle wheel components and vehicle wheels, which is characterized in that the metal body is at first machined at least in areas to be coated, after which at least two layers of paint are applied one after another, and at least one layer of paint is removed by machining in a partial area of the wheel. A component according to the present invention with a surface coating is thus characterized by areas machined with high precision and provided with a coating, wherein said coating has at least two layers of paint applied one on top of another, of which at least a first layer of paint is exposed in visible partial areas of the metal body, by a second layer of paint covering it being mechanically removed in partial areas not covered by it.

12 Claims, 9 Drawing Sheets

(56) References Cited

U.S. PATENT DOCUMENTS

| | | | |
|---|---|---|---|
| 6,376,016 B1 * | 4/2002 | Farquhar et al. | 427/258 |
| 6,536,111 B1 * | 3/2003 | Baumgarten et al. | 29/894.324 |
| 6,602,591 B1 * | 8/2003 | Smith | 428/220 |
| 6,872,425 B2 * | 3/2005 | Kaufold et al. | 427/404 |
| 8,336,208 B1 * | 12/2012 | Weld | 29/894.3 |
| 2003/0234570 A1 * | 12/2003 | Fischbacher et al. | 301/63.101 |
| 2005/0241950 A1 * | 11/2005 | Chen | 205/118 |
| 2006/0226697 A1 * | 10/2006 | Samson et al. | 301/37.27 |

FOREIGN PATENT DOCUMENTS

| | | |
|---|---|---|
| DE | 2328909 A1 | 1/1975 |
| DE | 244 944 A1 | 4/1987 |
| DE | 197 47 348 A1 | 5/1999 |
| EP | 2 145 708 A2 | 1/2010 |

* cited by examiner

VEHICLE WHEEL COMPONENTS, INCLUDING VEHICLE WHEELS, COMPRISING A SURFACE COATING AND METHOD FOR PRODUCING SUCH VEHICLE WHEEL COMPONENTS

CROSS REFERENCE TO RELATED APPLICATIONS

This application is a United States National Phase application of International Application PCT/EP2010/007013 and claims the benefit of priority under 35 U.S.C. §119 of German Patent Application DE 10 2009 054 243.4 filed Nov. 21, 2009, the entire contents of which are incorporated herein by reference.

FIELD OF THE INVENTION

The present invention pertains to vehicle wheel components, including vehicle wheels, with a surface coating, as well as a method for manufacturing a coated metal body, especially of vehicle wheel components, including vehicle wheels, by applying a coating.

The present invention pertains to vehicle wheel components as well as to vehicle wheels, above all to light alloy wheels or hub caps.

BACKGROUND OF THE INVENTION

Light alloy vehicle wheels for passenger cars and trucks consist, as a rule, of aluminum or magnesium alloy. Such components have hitherto been available as light alloy wheels for passenger cars and trucks according to common lacquering processes in different single-color variations and multicolor design was not possible in an industrial manufacturing process without maskings or complicated markings. Painted wheels, which have conspicuous contours differentiated in color in the entire styling area as well as on the inside of the wheel (brake-body-to-tire clearance area), are desired more and more.

Such painted areas have been produced hitherto by adhering or screwing on wheel part imitations having a different color, e.g., wheel flanges or spoke parts, to the light alloy wheel proper. In addition, a multicolor design was obtained by covering at first individual areas with templates or individual contours and providing the remaining free areas with another coating of paint. Different areas could be coated here one after another with different colors. All these processes for manufacturing painted wheels or for providing wheels with front-side painted areas, be it by means of wheel part imitations or painted lacquer coatings, are extremely expensive and only suitable for custom-made manufacture, private manufacture or for home use. Industrial manufacture in larger lots and with reproducible accuracy is not possible with the prior-art methods.

SUMMARY OF THE INVENTION

The basic object of the present invention is therefore to create different colors on a wheel on all visible surfaces, which colors can be reproduced in industrial mass production with high accuracy and high reproducibility.

The object is accomplished according to the present invention by vehicle components of the type mentioned in the introduction, which are characterized by high-precision, machined areas provided with a coating, wherein the coating has at least two layers of paint applied one on top of another, of which at least a first layer of paint is exposed in visible partial areas of the metal body by a second layer of paint covering same being mechanically removed in these partial areas not covered by this.

To accomplish the object of the present invention, provisions are, furthermore, made in a process of this class for the metal body being machined at least in areas that are to be coated, after which at least two layers of paint are applied one after another, and at least one layer of paint is removed by machining in a partial area of the wheel.

Consequently, a surface coating is carried out according to the present invention by means of coating media having different colors, such as coating powders or wet coatings, combined with a machining, also between coating operations. Layers that have reflectivity in a partial range of the visible light and thus create a color effect, such as red, yellow, green, blue, etc., for the viewer, are called layers of paint. The materials of the layers of paint are color varnishes, color powders and color pastes or other materials that can be applied as a flat coat. The layers of paint are lacquer systems, liquid lacquers or powder coatings, whose formulations contain pigments or colorants. The formulations are UV-resistant and of high durability. Painter's paints, emulsion paints or artist's paints are unsuitable for use as layers of paint.

Multicolor wheels are produced by the present invention with a higher quality than before based on the high repeatability of the method according to the present invention. The method according to the present invention comprises the industrial application of the coating layer (layers of paint) and the high-precision machining method. In addition, the method according to the present invention is substantially more economical than the current manufacturing processes.

The manufacturing method according to the present invention comprises the method steps listed below:
1. Precise machining of the surfaces, which shall receive a multicolor design.
2. Industrial application of the first layer of paint in a layer thickness range of 30 μm to 300 μm.
3. Industrial application of the second layer of paint in a layer thickness range of 30 μm to 300 μm.
4. Optionally: Application of a third, fourth, etc. layer of paint, the layer thickness range being 30 μm to 300 μm in each case.
5. Precise machining of the surfaces by removing the individual layers of paint by turning on the areas defined in advance.
6. Top-coating with a clear coat. This may have any desired degree of gloss (glossy, satin finish or flat). Functional properties, e.g., better ability to be cleaned or water-repellant properties, are also possible.

The color design is as desired, with all colors, e.g., with all colors of the NCS color chart, RAL classic and RAL design or individual color formulations.

A preferred embodiment of the components is characterized by a transparent layer covering at least the layers of paint.

Provisions are made in a component according to the present invention in a preferred embodiment for a layer of paint covering a partial area of the body only to be an outer layer of paint of the coating. In particular, the layers of paint preferably have a defined thickness. The coating thickness of the layers of paint is to be applied in a layer thickness range of 30 μm to 300 μm with a tolerance of ±30 μm, maximum.

Provisions are made in further preferred embodiments of the method according to the present invention for at least the additional layer of paint applied last is removed by cutting to such an extent that the additional layer of paint is completely removed in the remaining partial areas of the first layer of paint and the first layer of paint appears again, and, in particular, the layers are applied with a defined thickness. In addition, provisions are made by the present invention for the mechanical removal or removal by cutting at first of the basic material of the component and also of part of at least one layer of paint is preferably performed by turning and/or milling.

Mechanical removal or cutting at first of the basic material of the component to prepare a defined surface to be coated is performed with high measuring accuracy and repeatability, predetermined up to 1 µm, usually 3 µm, the accuracy depending on the thickness of the individual layer of paint and being greater in case of a small thickness, i.e., the operation is carried out with a narrow tolerance, but it [the accuracy] may be lower in case of thicker layers of paint (wider tolerance). It is essential that when an outer layer of paint is removed in a partial area to highlight a lower layer of paint, the outer one is removed completely in this partial area, but the lower one is not interrupted, i.e., it is preserved over its entire surface.

While ring-shaped surfaces can be designed as colored surfaces in the manner according to the present invention in a part with rotationally symmetrical areas, it is also possible, in particular, to machine and design areas such as spoke areas or intermediate areas between spokes of a wheel or even other isolated areas, such as letters or even exact letterings in the same manner.

The manufacturing method according to the present invention thus describes an industrial manufacturing method for producing a multicolor wheel by applying at least two colored coatings located one on top of another and by machining same to display the multicolor design. The multicolor design is obtained by removing at least one coating in partial areas by machining.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1b is a longitudinal sectional view through a wheel flange in an enlarged view in area B according to FIG. 1a;

DESCRIPTION OF THE PREFERRED EMBODIMENTS

Figure 1:
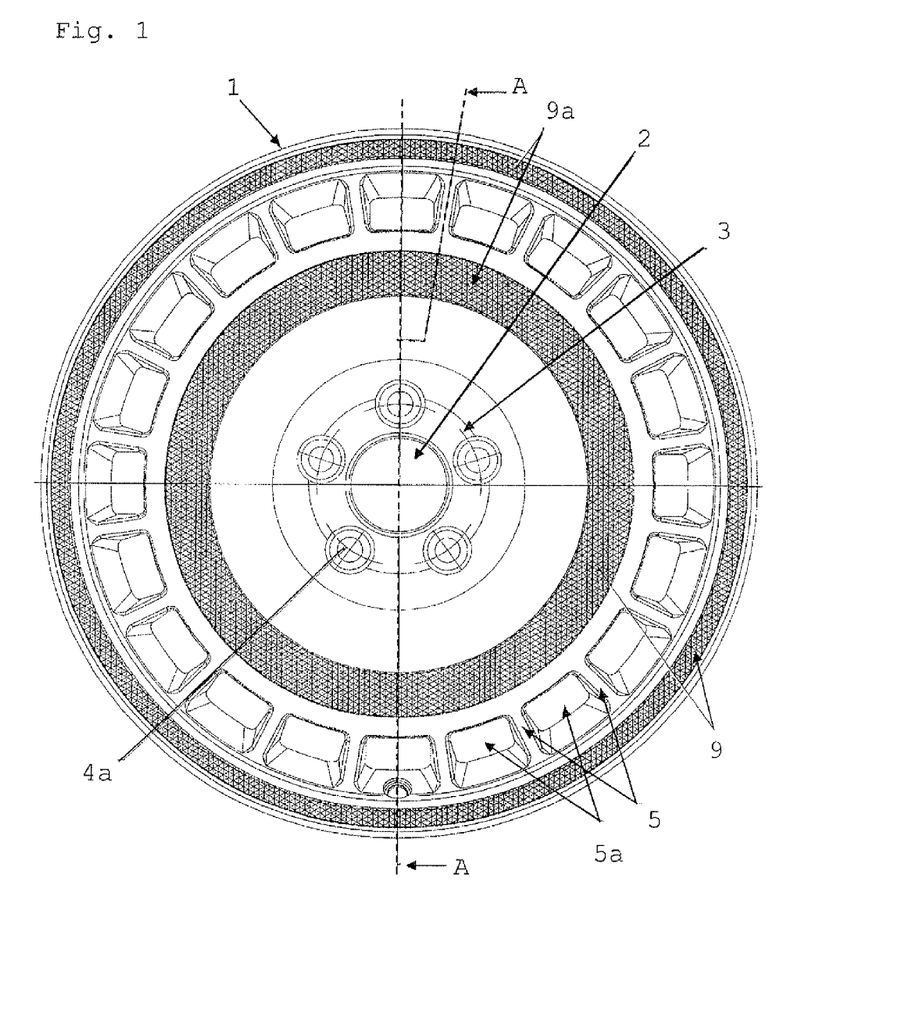
FIG. 1 is a front view of a wheel according to the present invention.
Figure 1A:
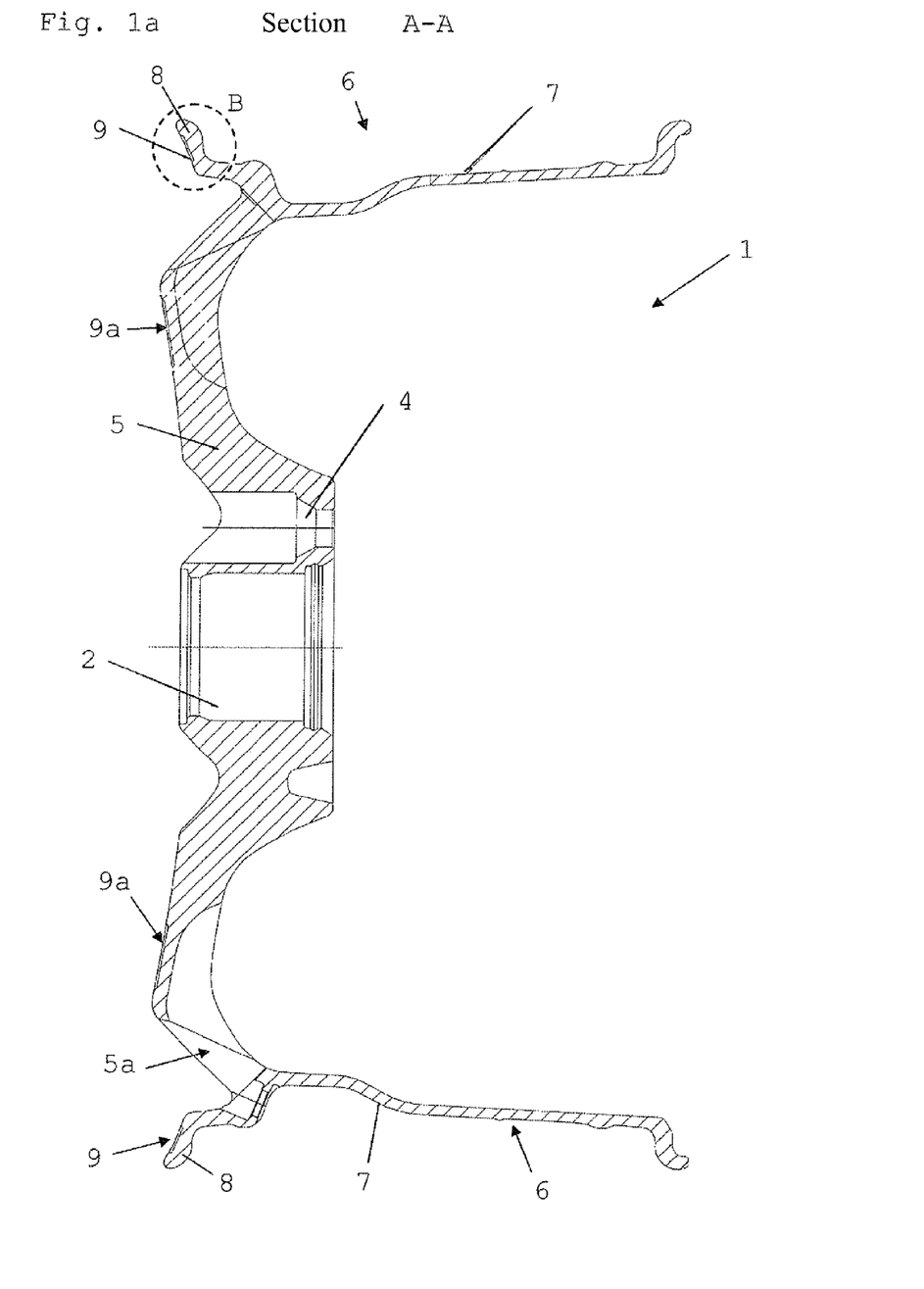
FIG. 1a is a partial longitudinal sectional view through a wheel according to the present invention along section A-A in FIG. 1.

A motor vehicle wheel, especially a light alloy wheel 1, has a hub 2, which is surrounded by a hole circle 3 with hole circle holes 4 for fastening bolts 4a and from which a plurality of spokes 5—with windows 5a between these—extend radially outwardly towards a rim 6 (FIG. 1a). Rim 6 has a rim well 7, into which a tire can be inserted, and a wheel flange 8. Wheel flange 8 is bent outwardly from the edge of the rim. In the exemplary embodiment shown, a front area of the wheel flange 8 has a two-tone design with a middle area 9, whose different color is indicated by crosshatching. Area 9 is characterized by a layer of paint having a different color than the area located on the inside and outside. Such a ring-shaped area 9a having a different color differing from the color of the prime layer (again shown by crosshatching) is also provided within the spoke flange. The entire wheel is provided with a clear coat.

Figure 1B:
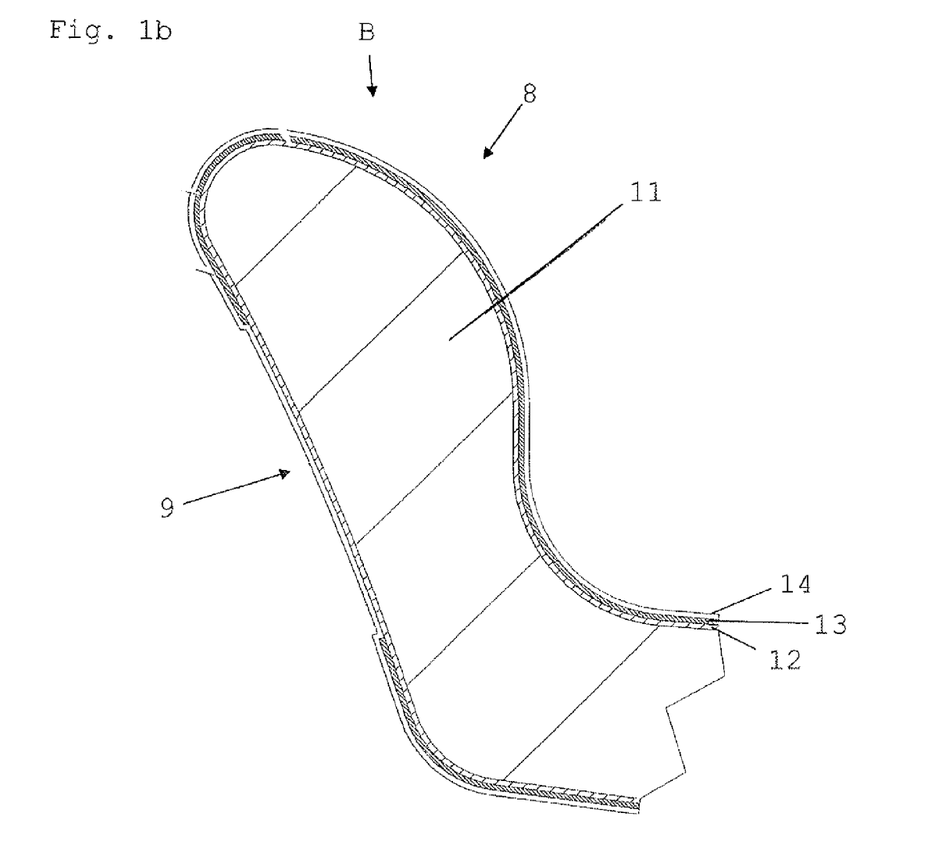

FIG. 1b shows an embodiment of a wheel flange 8. Wheel flange 8 may be designed, on the one hand, with a smooth shape, as is illustrated in FIG. 1b. On the other hand, wheel flange 8 may have a ring-shaped extension, which is formed as an annular surface on wheel 1. This makes it possible to apply different layers of paint with different paint layer thicknesses. In general, the manufacturing method according to the present invention can be applied in all areas of the wheel, but it is preferably applied on the design side (wheel flange, spokes, hub).

Figure 2A:
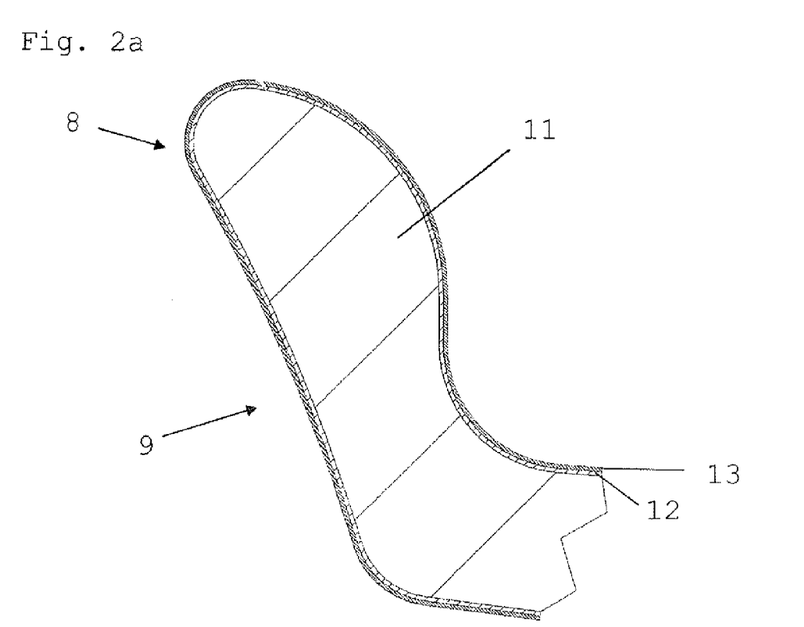
FIG. 2a is a sectional view of a step of a first method sequence for manufacturing a wheel according to the present invention by coating on the basis of the wheel flange according to FIG. 1b.

To manufacture a wheel according to the present invention, a method according to the present invention provides, in a first embodiment, for the following steps described below with reference to FIGS. 2a-2c. The method is shown graphically on the basis of a paint coating of a wheel flange.

A thin layer is at first mechanically removed, especially by turning, on the blank metal 11 of the wheel in order to achieve equalization of the surface with high accuracy. Two different layers of paint 12, 13 are then applied in the embodiment according to FIGS. 2a-2c. The individual coats 12, 13 are applied with high accuracy in terms of their thickness, i.e., close tolerances. The layers of paint/coats are applied industrially by application with automatic lacquer application devices.

Figure 2B:
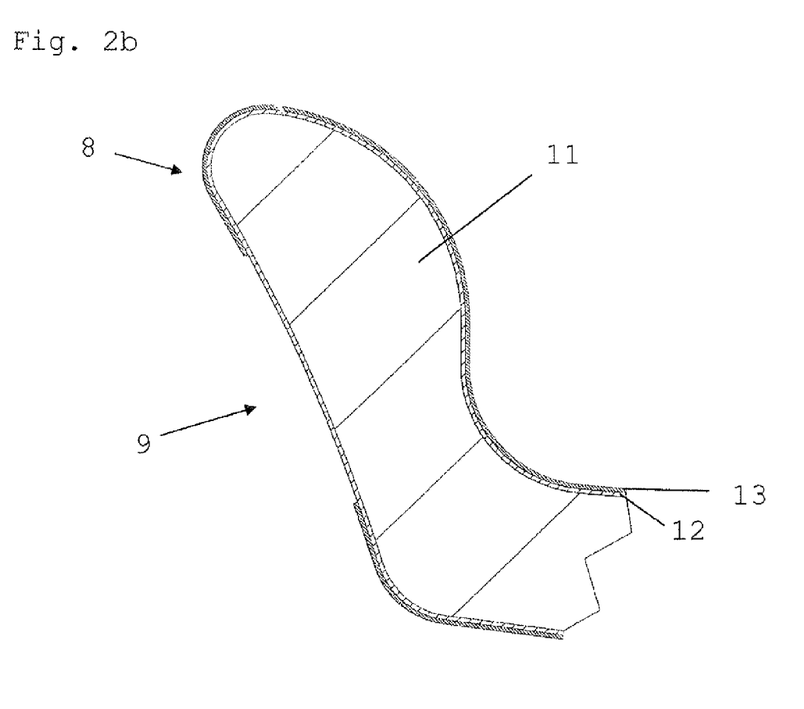
FIG. 2b is a sectional view of another step of a first method sequence for manufacturing a wheel according to the present invention by coating on the basis of the wheel flange according to FIG. 1b.
Figure 2C:
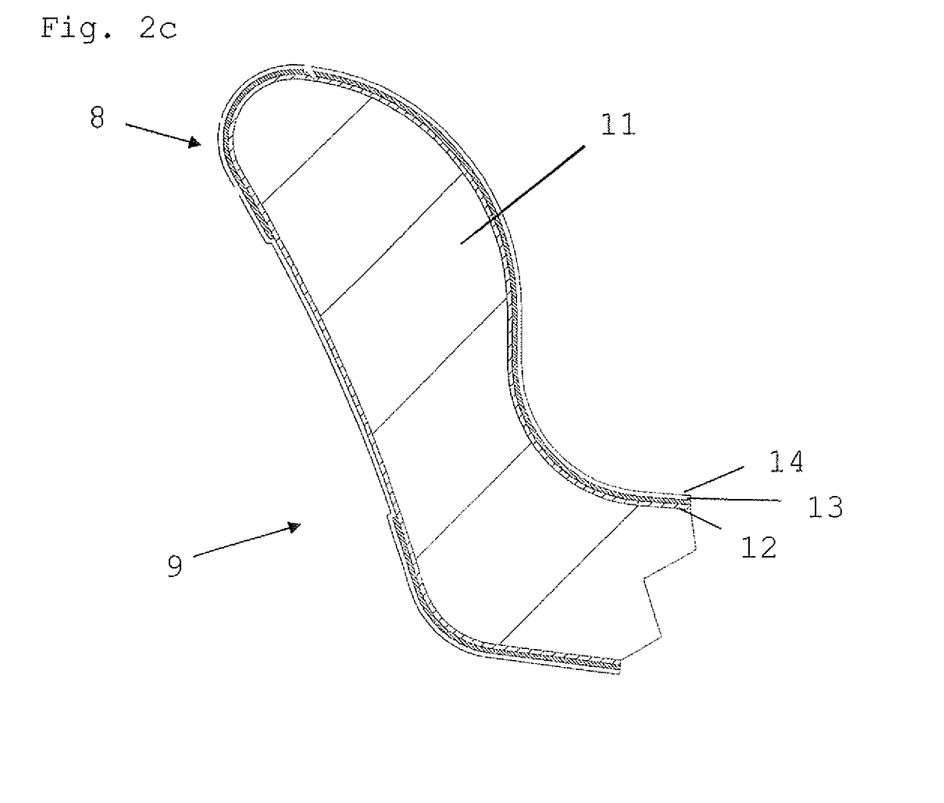
FIG. 2c is a sectional view of yet another step of a first method sequence for manufacturing a wheel according to the present invention by coating on the basis of the wheel flange according to FIG. 1b.

In another step, which is illustrated in FIG. 2b, a part of the outer layer of paint 13 is again removed, doing so by mechanical removal or cutting, here again by turning, so that the layer of paint 12 located under the outer layer of paint 13 will again appear as an annular surface in this area 9, as was described above with reference to FIGS. 1 and 1a. The outer layer of paint 13 remains in the surrounding area and thus produces a two-tone effect. A clear coat 14 is then applied, be it by powder coating (clear powder coatings) or clear coating or even with other transparent coating materials, as this is shown in the last step in FIG. 2c.

A wheel with a multicolor, here two-tone design of its visible areas can be manufactured hereby. All plain colors can be represented as a first layer of paint 12. All plain colors, but also effect coats, e.g., metallic coats, are possible as a second layer of paint 13.

The above procedure is the preferred one. However, a procedure as is illustrated by FIGS. 3a-3e in a simplified view of a somewhat modified embodiment of the method according to the present invention is also possible, especially in special cases.

A prime layer of paint 12 is again applied at first to the metal substrate 11 of the wheel after mechanical equalization. In the further step shown in FIG. 3b, this first prime layer of paint 12 is again removed partially in an area 9, so that it covers the wheel surface in a partial area only.

Figure 3A:
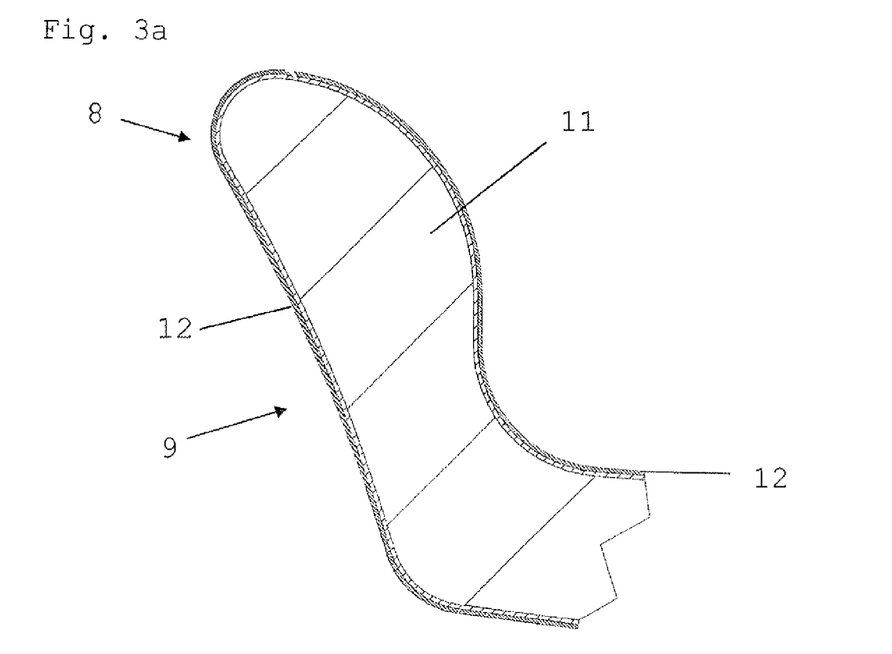
FIG. 3a is a sectional view of a step of another method sequence for manufacturing a wheel according to the present invention on the basis of a wheel flange according to FIG. 1b.
Figure 3B:
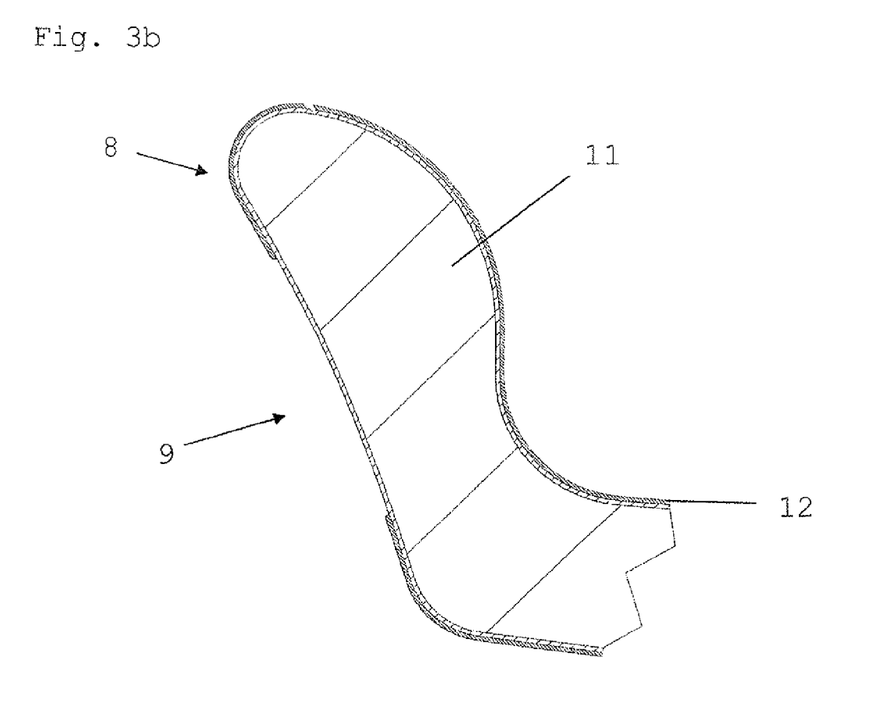
FIG. 3b is a sectional view of another step of another method sequence for manufacturing a wheel according to the present invention on the basis of a wheel flange according to FIG. 1b.
Figure 3C:
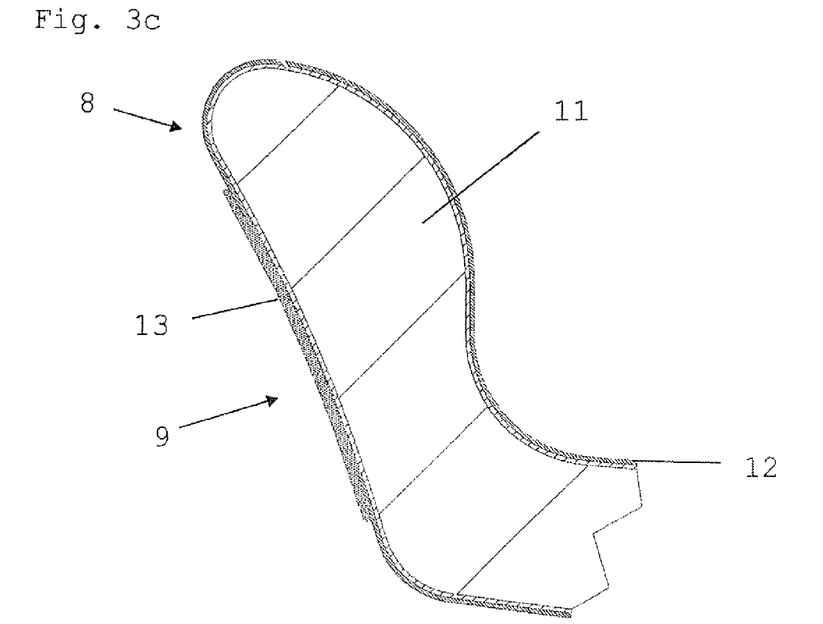
FIG. 3c is a sectional view of yet another step of another method sequence for manufacturing a wheel according to the present invention on the basis of a wheel flange according to FIG. 1b.

Another layer of paint 13 is then applied again on the entire surface, and said layer of paint 13 covers both the layer of paint 12 and area 9, in which layer of paint 12 was removed mechanically or by cutting in the above-described manner, while the second layer of paint 13 remains in the surrounding area.

Figure 3D:
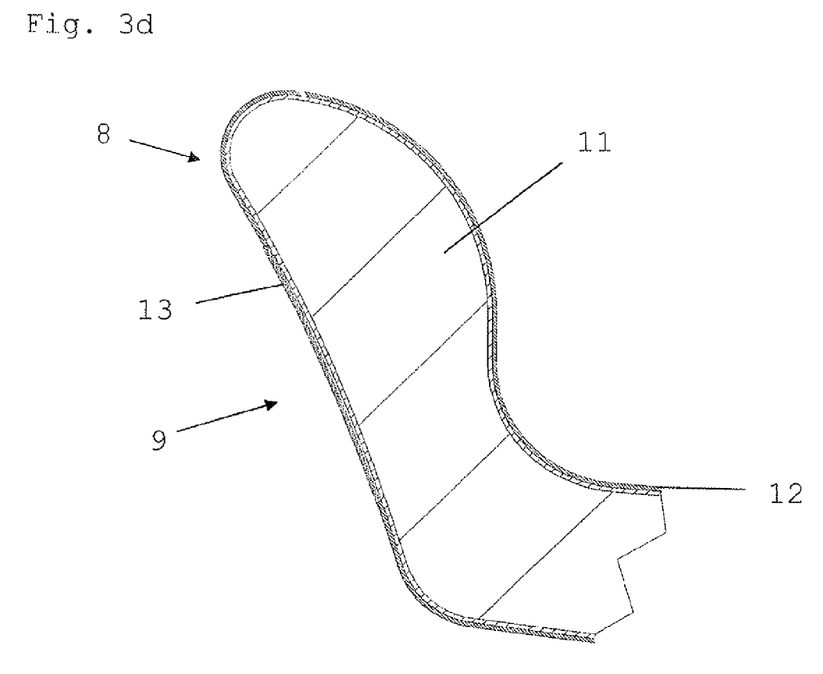
FIG. 3d is a sectional view of yet another step of another method sequence for manufacturing a wheel according to the present invention on the basis of a wheel flange according to FIG. 1b.

In a further method step shown in FIG. 3d, the layer of paint 13 applied last is then again removed by machining (here turning), doing so to the extent that the originally applied, first layer of paint 12 will again appear in area 9, whereas the layer of paint 13 applied last remains in area 9.

Figure 3E:
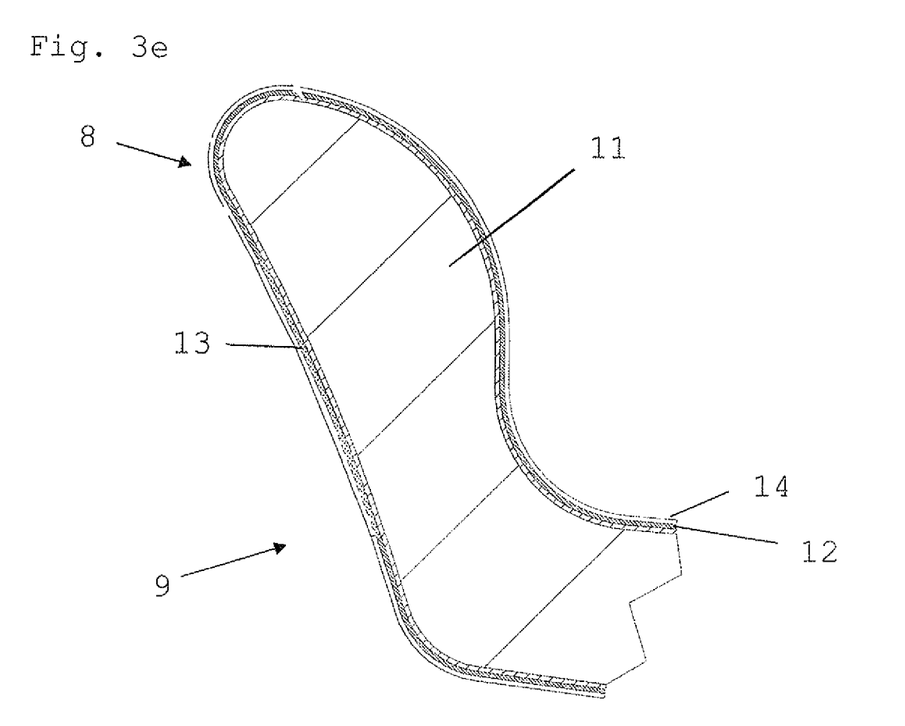
FIG. 3e is a sectional view of yet another step of another method sequence for manufacturing a wheel according to the present invention on the basis of a wheel flange according to FIG. 1b.

A clear coat 14 is subsequently applied, in turn, as a protective coating.

As a result, two different layers of paint can be applied to the front-side surface of a light alloy wheel and two-tone or even multicolor effect can thus in turn be achieved.

Both variants of the method according to the present invention for manufacturing a surface-coated wheel and for the surface coating of a wheel, which are described on the basis of simple examples, may obviously also be used to prepare additional, several layers of paint in different areas of the surface of the wheel in order to obtain a multicolor design with three or more colors.

Figure 4:
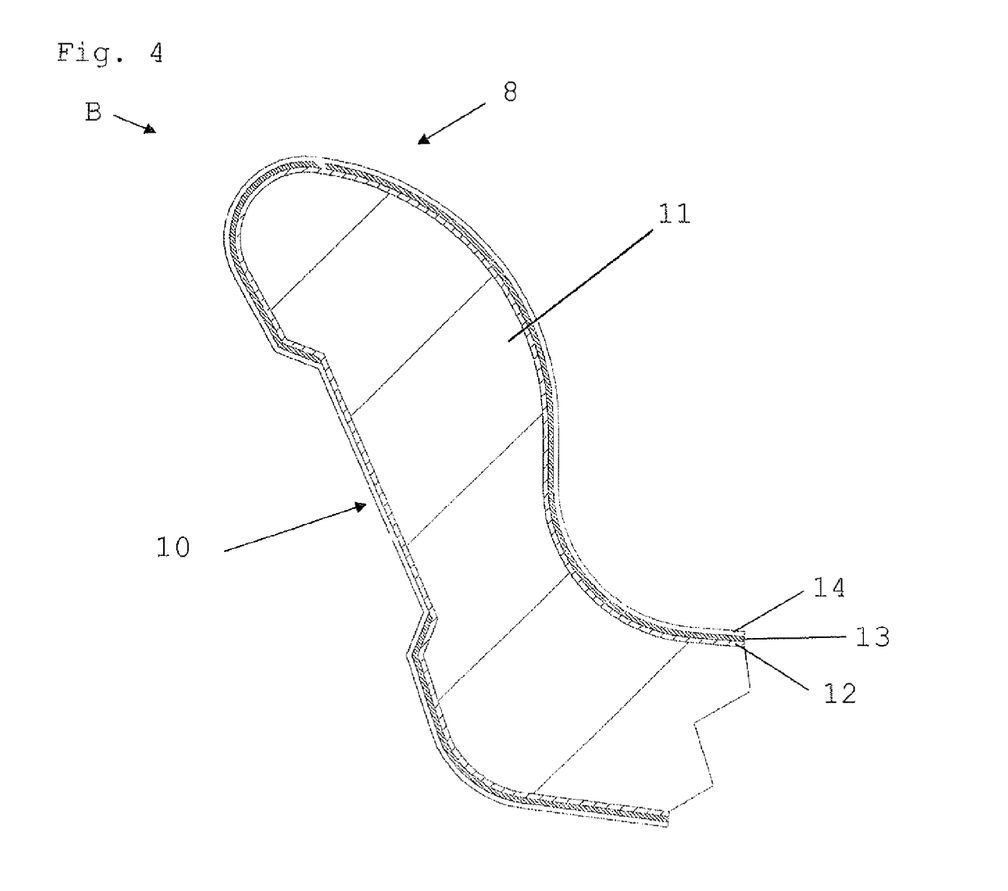
FIG. 4 is a longitudinal sectional view through a wheel flange in another embodiment of a wheel according to the present invention.

In the embodiment according to FIG. 4, the wheel flange has a depression on its outside in the metal, into which the layers (color and transparent coats) are introduced. The machining for producing the design according to the present invention is carried out in the same manner as described in connection with FIGS. 2a-2c and FIGS. 3a-3e.

While specific embodiments of the invention have been described in detail to illustrate the application of the principles of the invention, it will be understood that the invention may be embodied otherwise without departing from such principles.

The invention claimed is:

1. A method for manufacturing a coated light alloy wheel, the method comprising:
   machining the wheel at first at least in areas to be coated;
   applying a first layer of color paint onto the wheel;
   applying a second layer of color paint on said first layer of color paint; and
   mechanically machining the wheel by turning said second layer of color paint on at least defined areas and stopping said machining until said first layer of color paint below said second layer of color paint appears in said at least defined areas.

2. A method in accordance with claim 1, wherein after application and mechanical removal of a partial area of at least one layer of paint, a clear coat is applied, said clear coat engaging at least a portion of said first layer of color paint and at least said second layer of color paint in said at least defined areas.

3. A method in accordance with claim 1, wherein between the application of said first layer and said second layer, said first layer is removed at least partly in a partial area of the surface of the wheel prior to the application of said second layer.

4. A method in accordance with claim 3, wherein at least an additional layer of paint applied last is mechanically removed to the extent that the additional layer of paint is completely removed in the remaining partial areas and a layer of paint located under said additional layer appears again.

5. A method in accordance with claim 1, wherein the mechanically machining includes milling.

6. A method in accordance with claim 1, wherein the clear coat is applied by clear powder coating or clear coating.

7. A method in accordance with claim 1, wherein said first layer of color paint and said second layer of color paint are applied with a layer thickness of 30 μm to 300 μm.

8. A method in accordance with claim 1, wherein said first layer of color paint and said second layer of color paint are applied with a maximum tolerance of thickness of 30 μm.

9. A method for manufacturing a coated light alloy wheel, the method comprising the steps of:
   at first mechanically machining the wheel at least in areas to be coated by turning on a blank metal of the wheel in order to provide equalization of a surface of the wheel;
   applying a first layer of color paint onto the wheel;
   applying a second layer of color paint on said first layer of color paint;
   mechanically machining the wheel by turning the second layer of color paint on at least defined areas and stopping said machining until the first layer of color paint below the second layer of color paint appears in said at least defined areas.

10. A method in accordance with claim 9, wherein said first layer of color paint and said second layer of color paint are applied with a layer thickness of 30 μm to 300 μm.

11. A method in accordance with claim 9, wherein said first layer of color paint and said second layer of color paint are applied with a maximum tolerance of thickness of 30 μm.

12. A method for manufacturing a coated light alloy wheel, the method comprising:
   machining the wheel at first at least in areas to be coated;
   applying a first layer of color paint onto the wheel;
   applying a second layer of color paint on said first layer of color paint; and
   mechanically machining the wheel by turning said second layer of color paint on at least defined areas until said first layer of color paint below said second layer of color paint appears in said at least defined areas, wherein after application and mechanical removal of a partial area of at least one layer of paint, a clear coat is applied, said clear coat engaging at least a portion of said first layer of color paint and at least said second layer of color paint in said at least defined areas.

* * * * *